US006801226B1

(12) United States Patent
Daughtrey

(10) Patent No.: US 6,801,226 B1
(45) Date of Patent: Oct. 5, 2004

(54) GRAPHICAL USER INTERFACE FOR TRAVEL PLANNING SYSTEM

(75) Inventor: Rodney S. Daughtrey, Cambridge, MA (US)

(73) Assignee: ITA Software, Inc., Cambridge, MA (US)

( * ) Notice: Subject to any disclaimer, the term of this patent is extended or adjusted under 35 U.S.C. 154(b) by 0 days.

(21) Appl. No.: 09/431,679

(22) Filed: Nov. 1, 1999

(51) Int. Cl.[7] .................................................. G09G 5/00
(52) U.S. Cl. ........................ 345/763; 345/157; 345/163; 705/6; 705/5; 705/26
(58) Field of Search ................................. 345/163, 157, 345/763; 705/6, 5, 8, 26, 10, 14; 709/218

(56) References Cited

U.S. PATENT DOCUMENTS

| | | | |
|---|---|---|---|
| 4,862,357 A | 8/1989 | Ahlstrom et al. | |
| 5,021,953 A | 6/1991 | Webber et al. | |
| 5,177,684 A | 1/1993 | Harker et al. | |
| 5,191,523 A | * 3/1993 | Whitesage | ................. 364/407 |
| 5,237,499 A | 8/1993 | Garback | |
| 5,253,166 A | 10/1993 | Dettelbach et al. | |
| 5,255,184 A | 10/1993 | Hornick et al. | |
| 5,331,546 A | 7/1994 | Webber et al. | |
| 5,422,809 A | 6/1995 | Griffin et al. | |
| 5,559,707 A | 9/1996 | DeLorme et al. | |
| 5,644,721 A | 7/1997 | Chung et al. | |
| 5,784,583 A | 7/1998 | Redpath | |
| 5,786,816 A | 7/1998 | Macrae et al. | |
| 5,794,172 A | 8/1998 | Matheson et al. | |
| 5,797,127 A | 8/1998 | Walker et al. | |
| 5,832,454 A | 11/1998 | Jafri et al. | |
| 5,838,973 A | 11/1998 | Carpenter-Smith et al. | |
| 5,897,620 A | 4/1999 | Walker et al. | |
| 5,948,040 A | * 9/1999 | DeLorme et al. | ............ 701/201 |
| 6,209,026 B1 | * 3/2001 | Ran et al. | .................... 709/218 |
| 6,263,315 B1 | * 7/2001 | Talluri | ............................ 705/8 |
| 6,304,850 B1 | * 10/2001 | Keller et al. | .................... 705/5 |
| 6,307,572 B1 | * 10/2001 | DeMarcken et al. | ......... 345/763 |
| 6,360,205 B1 | 3/2002 | Iyengar et al. | .................. 705/5 |
| 6,442,526 B1 | 8/2002 | Vance et al. | .................... 705/5 |

FOREIGN PATENT DOCUMENTS

| | | |
|---|---|---|
| EP | 0 451 371 A1 | 10/1991 |
| EP | 0 762 306 A2 | 12/1997 |
| WO | WO 89/07798 | 8/1989 |
| WO | WO 97/08639 | 6/1997 |

OTHER PUBLICATIONS

"Towards desktop personal travel agents", D.T. Ndumu, J.C. Collis and H.S. Nwana, BT Technol. Journal., vol. 16, No. 3, Jul. 1998, pp. 69–78.

Harniman, Brian, Online Travel Site: Where Do You Really Want to Go Today?, My Mac Magazine Online, Issue #24, Apr. 1997.

Internet Archive Wayback Machine: Jan. 30, 1997, http:www.expedia.com.

* cited by examiner

Primary Examiner—Kristine Kincaid
Assistant Examiner—Mylinh T Tran
(74) Attorney, Agent, or Firm—Fish & Richardson P.C.

(57) ABSTRACT

A graphical user interface for a travel planning system is described. The graphical user interface is implemented as a web page and includes a tabular region of the graphical user interface that displays summarized travel options and comprises a plurality of cells that act as controls. The interface also includes a second region that displays selected travel options resulting from filtering a set of travel options in accordance with a control actuated in the tabular region.

19 Claims, 7 Drawing Sheets

FIG. 4

Boston, MA (BOS) to Los Angeles, CA (LAX)    7 hrs 25 min

Frontier Airlines Flight F9 563 on a Boeing B-737 (jet)    Thur, Oct 28
Departs Boston, MA (BOS)    5:40p    4 hrs 35 min
Arrives Denver, CO (DEN)    8:15p
     Layover in Denver    30 min
Frontier Airlines Flight F9 419 on a Boeing B-737 (jet)    Thur, Oct 28
Departs Denver, CO (DEN)    8:45p    2 hrs 20 min
Arrives Los Angeles, CA (LAX)    10:05p

Los Angeles, CA (LAX) to Boston, MA (BOS)    7 hrs 18 min

Northwest Airlines Flight NW300 on a Boeing B-757 (jet)    Thur, Nov 4
Departs Los Angeles, CA (LAX)    12:45a    3 hrs 28 min
Arrives Minneapolis/St. Paul, MN (MSP)    6:13a
     Layover in Minneapolis/St. Paul    1 hr 2 min
Northwest Airlines Flight NW714 on a Boeing B-757 (jet)    Thur, Nov 4
Departs Minneapolis/St. Paul, MN (MSP)    7:15a    2 hrs 48 min
Arrives Boston, MA (BOS)    11:03a Note: The flight from Los Angeles (LAX) to Minneapolis/St. Paul (MSP) is overnight.

— Press the back button on your browser to go back —

Show booking details

We are unable to confirm the availability of this option.

This ticket is non-refundable.

Changes to this ticket will incur a penalty fee.

FIG. 6

GRAPHICAL USER INTERFACE FOR TRAVEL PLANNING SYSTEM

BACKGROUND

This invention relates generally to computerized travel planning systems.

Travel planning systems are used to produce itineraries and prices by selecting suitable travel units from databases concerning geographic scheduling and pricing information. In particular, travel planning systems that operate over the Internet are known. Some computer travel planning systems, such as Internet sites, generally produce a set of planning options, or itineraries for the traveller to consider. These options are often in the form of a single list of the possible itineraries from which the traveller may select. Such a display approach makes it difficult to clearly compare, discriminate, focus, and assimilate criteria and information that are likely to be important to the traveller.

SUMMARY

According to an aspect of the invention, a graphical user interface for a travel planning system includes a tabular region of the graphical user interface that displays summarized travel options and comprises a plurality of cells that act as controls and a second region that displays selected travel options resulting from filtering a set of travel options in accordance with a control actuated in the tabular region.

According to a further aspect of the invention, a method for displaying travel options includes compartmentalizing travel options into bins according to a set of criteria. The invention has compartmentalizing travel options into 'bins', according to a set of criteria through displaying the resulting bins in a table.

One or more of the following advantages may be provided by one or more aspect of the present invention.

With a summary table as part of a user interface to the travel planning system, travellers can select individual bins in order to focus on a subset of travel options that they are interested in. Selecting an individual cell displays a secondary level of information about the travel options that are represented in that cell. In this secondary level of information about individual travel options, each travel option has a mechanism for selecting and displaying the details of that specific travel option. The summary table can appears in the top frame of a web browser.

BRIEF DESCRIPTION OF THE DRAWINGS

FIGS. 3–5 are diagrams of web pages depicting results of executing a query for a round trip based on information entered through the query screen of FIG. 2.

FIGS. 6 and 7 are diagrams of web pages depicting details of travel options provided in the web pages of FIGS. 3–5.

DESCRIPTION

Figure 1:
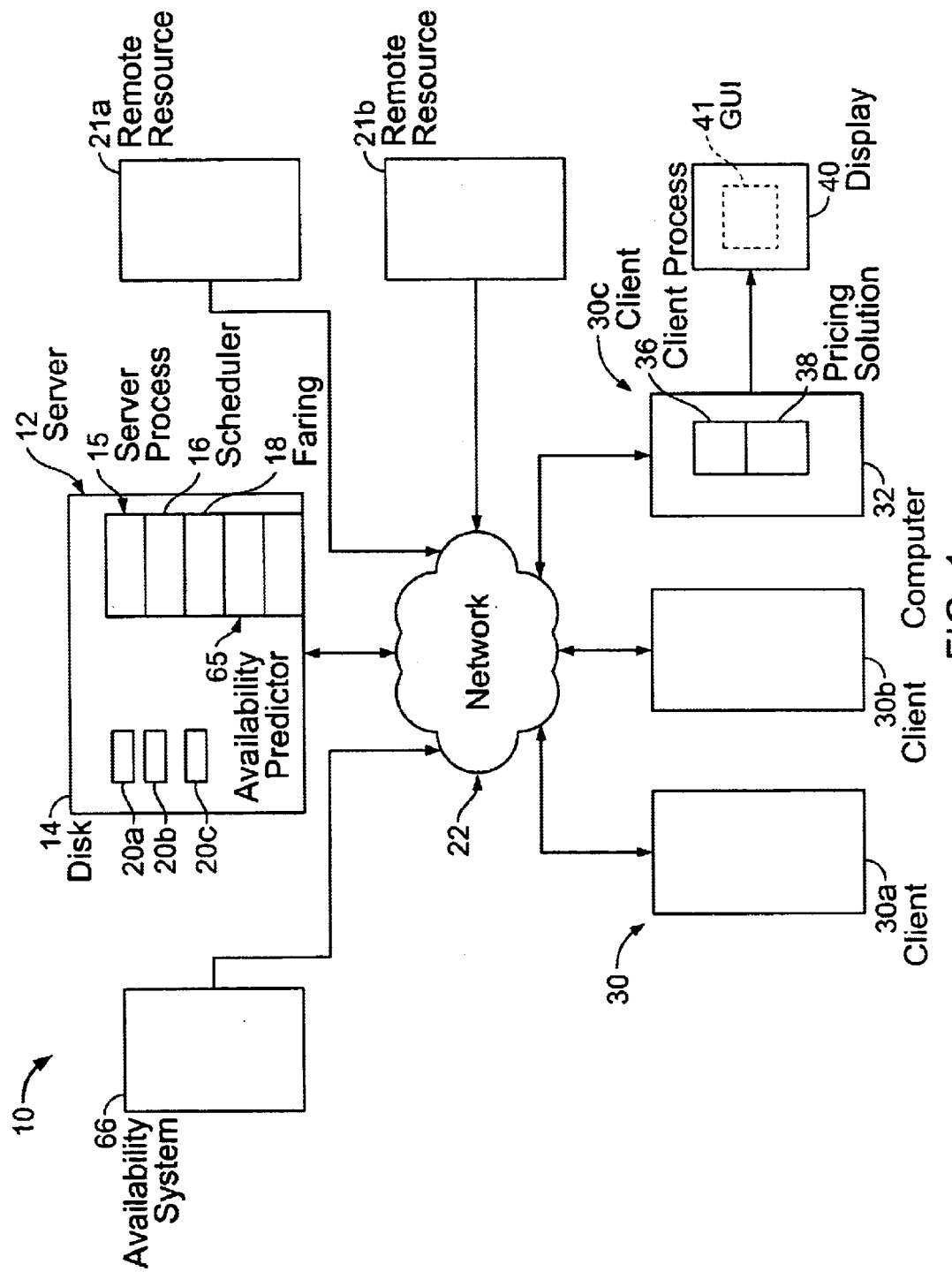
FIG. 1 is a block diagram of a client server travel planning system particularly operable over the Internet.

Referring to FIG. 1, a travel planning system 10 is shown. The travel planning system 10 can be used with various forms of travel such as airline, bus and railroad and is particularly adapted for air travel. Travel system 10 can include a server computer 12 having a computer memory or storage media 14 storing a server process 15. The server process 15 can include a scheduler process 16 and a faring process 18. An example of a scheduler process 16 is described in copending U.S. patent application Ser. No. 09/109,622, entitled "Scheduler System for Travel Planning Systems", filed on Jul. 2, 1998 by Carl G. DeMarcken et al. and assigned to the assignee of the present invention and incorporated herein by reference. Also an example of a faring process 18 is described in copending U.S. patent application Ser. No. 09/109,873, entitled "Graphical User Interface for Travel Planning Systems", filed on Jul. 2, 1998 by Carl G. DeMarcken et al and also assigned to the assignee of the present invention and incorporated herein by reference. As described in the incorporated references, the system 10 can include databases 20a–20b and these databases 20a–20b are typically stored locally and updated periodically by accessing remote resources 21a, 21b that maintain the respective databases. The system 10 can also include a plurality of clients 30a–30c coupled to the server 12 via a network 22. The network 22 can be any local or wide area network or an arrangement such as the Internet. Other travel planning systems such as those on the Internet can also be used.

The scheduler process 16 provides itineraries to a faring process 18. The faring process provides a set of pricing solutions by finding valid fares corresponding to the itineraries produced by the scheduler process 16. The faring process 18 also validates the fares for inclusion in a set of pricing solutions. The information to have the server produce the set of pricing solutions is obtain from a user entering data in a graphical user interface as will be described below. In addition, the set of pricing solutions are also displayed to the user through the graphical user interface.

Figure 2:
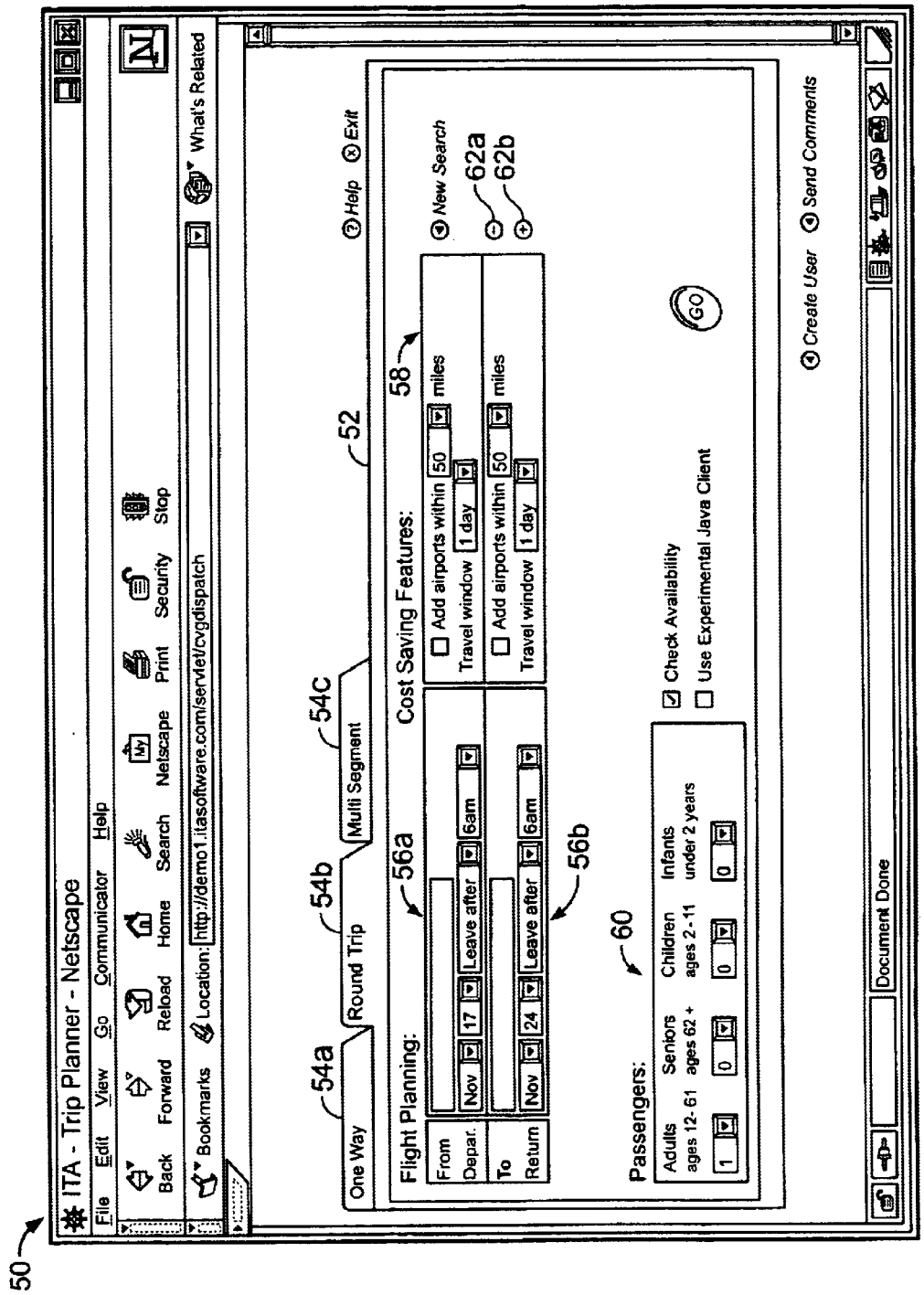
FIG. 2 is a diagram of a query screen for a graphical user interface implemented as a web page from a web browser.

Referring now to FIG. 2, a web page 50 that is part of a graphical user interface for the client process 36 is shown. The web page 50 allows the user to construct a query which can be executed by the server process 16 to produce flight plan options for the user.

The web page 50 includes a query table 52 which is a tab table 54 here comprised of three tabbed regions 54a–54c. The first tab is labeled one-way, the second tab round trip 54b and the third tab multi-segment 54c. The multi-segment tab is shown and is substantially the same as the other tabs except that the multi-segment tab allows the user to enter data for multiple segments of a flight by allowing the user to construct a new query segment region. For example, as shown in FIG. 2, the table includes a region 56a for entering flight information for a first segment of a flight. The information includes an origin to a destination and information concerning dates and time of travel. The query also allows the user to specify some potential cost saving feature by allowing the user to cause the server to look for other airports within 50 miles of a designated airport and include such other airports in answers for the segment. It also allows a user to specify a travel window. The table 54 can also include a second segment (not shown) having regions for entering similar information and includes controls 62a and 62b for either removing a segment from the query or adding a segment to the query, thus allowing a user to provide a complex arrangement of segments corresponding to multi-segmented flights.

The web page 50 also allows for entry of passenger information such as the number of adults, seniors, children and infants which may be important in determining the fare price for a ticket. The web page 50 also allows a user to have the server process check seat availability on designated flights. With the check availability box activated, the server process 16 will return travel options for which there is seat availability.

Figure 3:
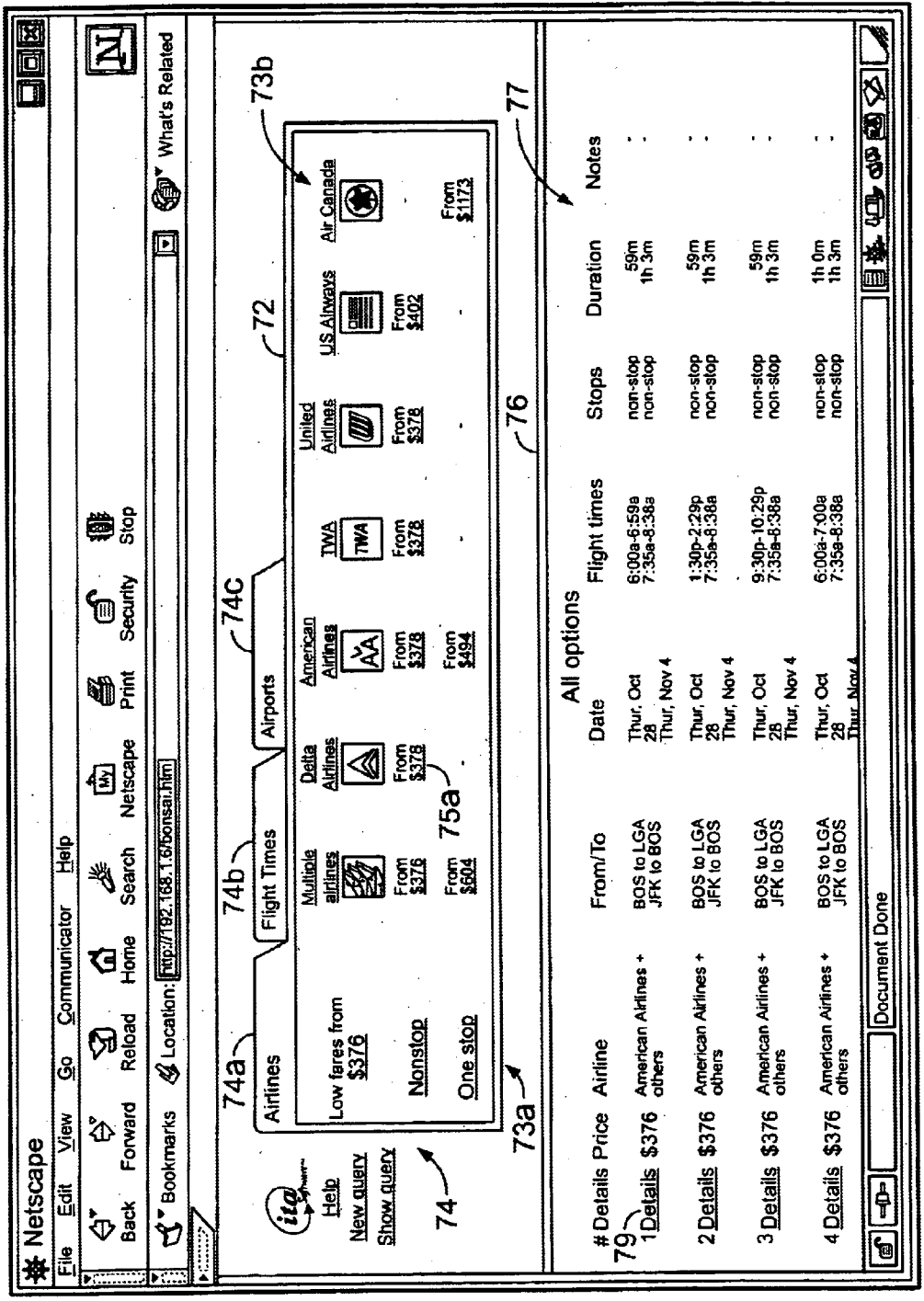

Referring now to FIG. 3, a web page 70 that depicts results from the server process 16 executing a query entered via the query page (FIG. 2) is shown. The web page 70, includes a table 72 that summarizes travel options. The travel option summary table 72 is a tab table comprised of a tab 74a that groups summary information by airlines, a tab 74b that groups summarized information by flight times and a tab 74c that summarizes travel information by airports.

Figure 4:
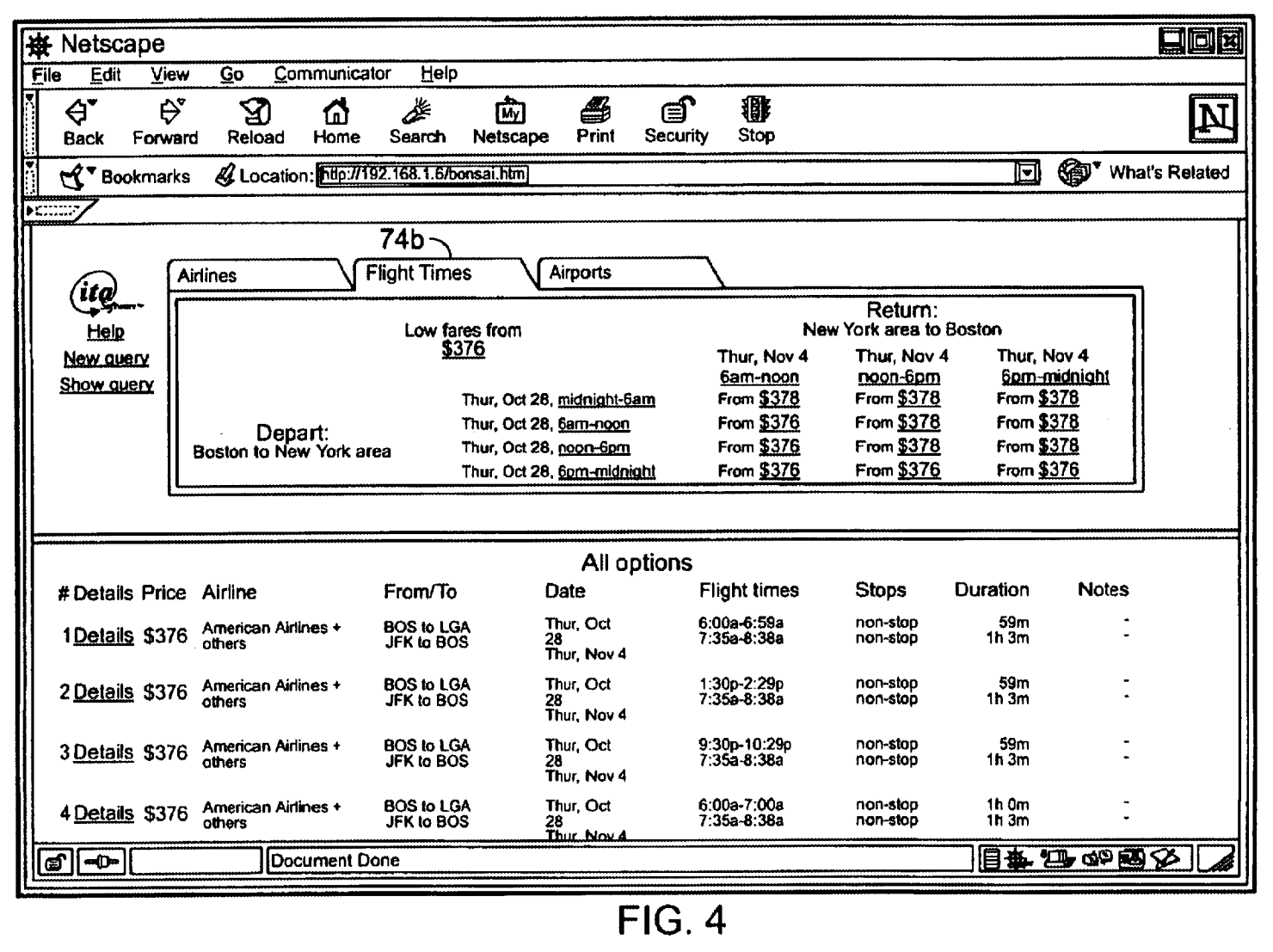
Figure 5:
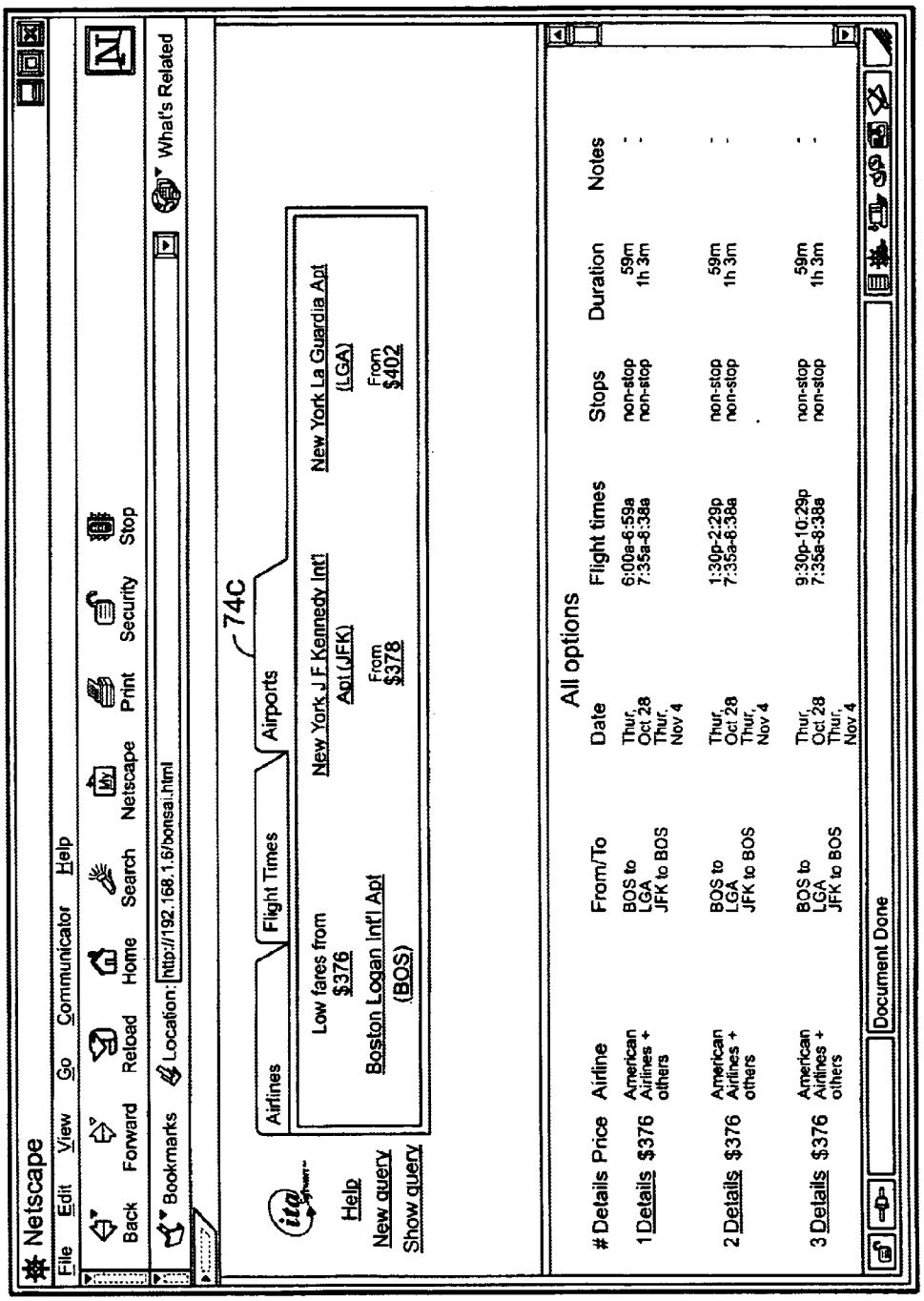

As shown in FIG. 3, with the airline tab 74a selected, the summary information in the table is arranged in rows and columns with each of the airlines arranged in columns of the table as links and each of the rows of the table 72 arranging specified travel options such as non-stop flights or one-stop flights, as links. Interior cells within the table 72 are links which correspond to prices for each of the airlines with respect to each of the travel options. The table displays a set of air travel options according to specified criteria, e.g., the airlines used in one or more of the travel options (displayed from left to right at the top of the table), and the number of stops or connections in the set of travel options. Here, the travel options represented by a given table cell are those options which use the airline in the same column as that cell, and that have the same number of stops as the "number of stops" header in the same row as that cell. A third criteria, price (i.e. price of an airline ticket), is displayed in each cell of the table; this price is the minimum price for any of the travel options that are represented by a given cell. Selecting a cell (by clicking on a URL in this case) displays, in the lower pane, a listing of the travel options for that particular cell. Each travel option contains a 'details' URL link in the row of information devoted to that travel option; clicking on that link takes the traveller to yet a third level of information, a detailed description of that travel option as shown in FIGS. 4 and 5.

A general procedure to construct the graphical user interface is given below:

1) Obtain list of query-specific travel options.
2) For each criteria in travel options:
   Enumerate bins for the criteria
   For each travel option T:
      Place travel option T into some bin
3) Given the bins computed in (2), compute intersections of bins to determine what bins go in what cells of the summary table
4) Generate and display summary table given information from procedure (3).

If the travel system operates on a pricing graph, the links are hyperlinks to a enumeration algorithm such as described in the copending application which can sort through a pricing graph, as described in the above application, and return a set of travel options which correspond to the intersection of here the airline represented in the column and the travel option represented in the selected row. Otherwise the links activate routines to sort through a list of travel options.

Figure 7:
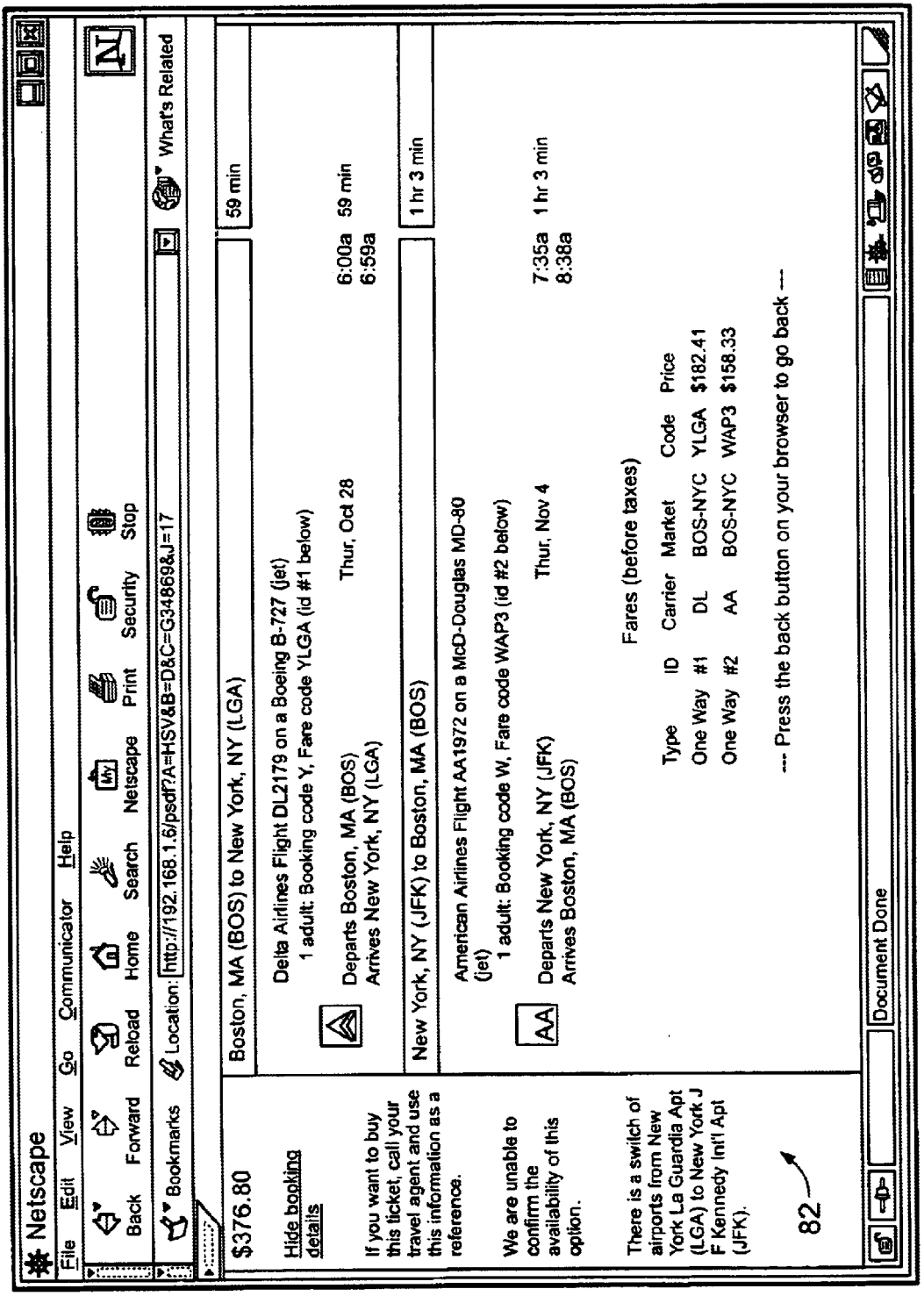

Thus, for example, selecting Delta Airlines and non-stop flights corresponding to cell 75a which has value of $378 will bring up all non-stop options on Delta Airlines, e.g., no stops in any segment and depict the top 30 of those results in the results frame 76. Thus, the links in the table 72 are used to control the display of travel options in the results frame 76. The results frame 76 includes a plurality of results, here the top 30 results are typically shown, arranged in a table with a hyperlink denoted as "details" which, when activated, brings up details of the travel option such as shown in FIG. 6. FIG. 6 also has a second link which, when activated, brings up booking details as shown in FIG. 7. FIGS. 6 and 7 in addition to showing details of the travel option also shows warnings 80 and planning suggestions 82.

Returning to FIG. 3, the table 72 allows the display of summary information in different manners depending on which tab is selected.

As shown in FIG. 4, when the flight time tab 74b is selected, the table 72 is arranged to show departure times between the origin and the destination over ranges of times for the potential days of travel in the outbound portion of the trip in rows of the table, as well as departure time for the return portion of the trip in columns of the table 72 over time ranges in the potential return days. Thus, selecting one of the outer peripheral cells of the table will bring up all flight options on a designated day in the designated time area; whereas selecting an interior cell will produce the intersection of options for a time segment on the selected outbound date and the time segment of the selected return date. The table 72 also depicts the starting or lowest fares for each one of the different time segments allowing a user to decide the most appropriate time to travel giving considerations such as cost and convenience.

As shown in FIG. 5, when the airport tab 74c is selected, the summary table has columns corresponding to destination airports and rows corresponding to origin airports.

The summary table 72 segments or compartmentalizes travel options into bins, according to criteria that the user might use to select a specific travel option. Each dimension of the table has a travel criteria associated with it (for example, a two-dimensional table would have a criterion along the horizontal rows of the table, and a criterion along the vertical columns of the table). In addition, another, different criteria is represented in the cells of the table. The process for producing a summary table, given a set of travel options and a set of criteria, is given below. For example, other criteria could be used within the interior cells or at the edges of the table.

The graphical user interface is populated by obtaining a list of query-specific travel options. For each criteria the process will enumerate bins for this criteria, and for each travel option T, the process places the travel option T into some bin. Given the bins computed the process computes intersections of bins to determine what bins go in what cells of the summary table. The process generates and displays the summary table with the determined information.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A graphical user interface, for displaying information pertaining to a set of travel options, the graphical user interface comprising:
   a summary tabular region comprising:
      a first dimension of the summary tabular region associated with a first criterion, the first dimension divided into portions corresponding to different values of the first criterion included in the set of travel options; and a second dimension of the summary tabular region associated with a second criterion, the second dimension divided into portions corresponding to different values of the second criterion included in the set of travel options; and a cell disposed within the summary region at the intersection of a first portion of the first dimension and a first portion of the second dimension, the cell representing a subset of the set of travel options that have a value for the first criterion that corresponds to the first portion of the first dimension and a value for the second criterion that corresponds to the first portion of the second dimension.

2. The graphical user interface of claim 1 further wherein the first and second dimensions comprise a row, a column or a tab.

3. The graphical user interface of claim 1 further wherein the first and second criteria comprise a carrier, a departure location, an arrival location, a departure time, an arrival time, a trip duration, a number of stops, a travel date.

4. The graphical user interface of claim 1 further comprising a detail region to display a listing of the subset of travel options associated with the cell.

5. The graphical user interface of claim 4 further comprising a link within the cell to allow the user to select the subset of travel options for display within the detail region.

6. The graphical user interface of claim 1 wherein the cell further comprises a value of a third criterion.

7. A method for generating a graphical user interface, the method comprising:

receiving a set of travel options resulting from a query;

displaying a first dimension of the summary tabular region associated with a first criterion, the first dimension divided into portions corresponding to different values of the first criterion included in the set of travel options;

displaying a second dimension of the summary tabular region associated with a second criterion, the second dimension divided into portions corresponding to different values of the second criterion included in the set of travel options; and displaying a graphical element at the intersection of a first portion of the first dimension and a first portion of the second dimension, the graphical element representing a subset of the set of travel options that have a value for the first criterion that corresponds to the first portion of the first dimension and a value for the second criterion that corresponds to the first portion of the second dimension.

8. The method of claim 7 wherein the first and second dimensions comprise a row, a column or a tab.

9. the method of claim 7 wherein the first and second criteria comprise a carrier, a departure location, an arrival location, a departure time, an arrival time, a trip duration, a number of stops or a travel date.

10. The method of claim 7 further comprising displaying a listing of the subset of travel options associated with the graphical element.

11. The method of claim 7 further comprising allowing a user to select a listing of the subset of travel options for display by using the graphical element.

12. The method of claim 7 further comprising displaying with the graphical element a value of a third criterion.

13. A computer program product residing on a computer readable medium for generating a graphical user interface that displays a summary of travel options, the computer program product comprising instructions for causing a computer to:

a first dimension of a summary tabular region associated with a first criterion, the first dimension divided into portions corresponding to a different values of the first criterion included in a received set of travel options resulting from a query;

a second dimension of a summary tabular region associated with a second criterion, the second dimension divided into portions corresponding to different values of the second criterion included in the received set of travel options resulting from the query; and a graphical element at the intersection of a first portion of the first dimension and a first portion of the second dimension, the graphical element representing a subset of the set of travel options that have a value for the first criterion that corresponds to the first portion of the first dimension and a value for the second criterion that corresponds to the first portion of the second dimension.

14. The computer program product of claim 13 wherein the first and second dimension comprise a row, a column or a tab.

15. The computer program product of claim 13 wherein the first and second criteria comprise a carrier, a departure location, an arrival location, a departure time, an arrival time, a trip duration, a number of stops or a travel date.

16. The computer program product of claim 13 further comprising instructions to:

display a listing of the subset of travel options associated with the graphical element.

17. The computer program product of claim 13 further comprising instructions to:

allow a user to select a listing of the subset of travel options for display by using the graphical element.

18. The computer program product of claim 13 further comprising instructions to:

display with the graphical element a value of a third criterion.

19. The computer program product of claim 13 further comprising instructions to cause an operating system of the computer to:

display the interface on a output device.

* * * * *